US012593354B2

(12) United States Patent
Hong

(10) Patent No.: US 12,593,354 B2
(45) Date of Patent: Mar. 31, 2026

(54) METHOD FOR WIRELESS COMMUNICATION, TERMINAL, BASE STATION, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 514 days.

(21) Appl. No.: 18/005,152

(22) PCT Filed: Jul. 28, 2020

(86) PCT No.: PCT/CN2020/105280
§ 371 (c)(1),
(2) Date: Jan. 11, 2023

(87) PCT Pub. No.: WO2022/021089
PCT Pub. Date: Feb. 3, 2022

(65) Prior Publication Data
US 2023/0262752 A1 Aug. 17, 2023

(51) Int. Cl.
*H04W 74/00* (2009.01)
*H04W 68/00* (2009.01)
*H04W 74/0833* (2024.01)

(52) U.S. Cl.
CPC ....... *H04W 74/006* (2013.01); *H04W 68/005* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 7,167,830 B2* | 1/2007 | Sravanapudi | ......... | H04L 67/568 709/213 |
| 7,590,421 B2* | 9/2009 | Ryu | ...................... | H04W 60/04 370/335 |
| 8,644,864 B2* | 2/2014 | Zeira | ...................... | H04W 72/04 455/500 |
| 8,909,268 B2* | 12/2014 | Zeira | ....................... | H04W 4/08 455/500 |
| 11,218,965 B2* | 1/2022 | Kim | ................... | H04W 52/0229 |
| 2012/0178485 A1* | 7/2012 | Zeira | ..................... | H04W 68/00 455/515 |
| 2014/0148204 A1* | 5/2014 | Zeira | ..................... | H04W 68/00 455/458 |
| 2015/0092741 A1* | 4/2015 | Zeira | ..................... | H04W 68/00 370/330 |

(Continued)

FOREIGN PATENT DOCUMENTS

CN          108307431 A          7/2018

OTHER PUBLICATIONS

International Search Report and Written Opinion of International Application No. PCT/CN2020/105280, mailed Apr. 27, 2021, 14 pages.

*Primary Examiner* — Faiyazkhan Ghafoerkhan
(74) *Attorney, Agent, or Firm* — Finnegan, Henderson, Farabow, Garrett & Dunner, L.L.P.

(57) ABSTRACT

A method for wireless communication is performed by a base station, and includes: sending a paging signaling to one or more terminals of a multi-modal service.

19 Claims, 7 Drawing Sheets base station terminal at step 31, sending a paging signaling to one or more terminals of a multi-modal service at step 51, determining that the received access request is the access request of the multi-modal service in response to the access request sent using random access information at step 41, setting up an RRC connection with the one or more terminals respectively in response to the access request of the multi-modal service sent based on the paging signaling

(56)         References Cited

U.S. PATENT DOCUMENTS

| | | | | |
|---|---|---|---|---|
| 2017/0280481 | A1* | 9/2017 | Stern-Berkowitz | ........................... H04W 74/002 |
| 2019/0239255 | A1* | 8/2019 | Stern-Berkowitz | ........................... H04L 5/0092 |
| 2020/0275496 | A1* | 8/2020 | Stern-Berkowitz | ........................... H04W 68/005 |
| 2020/0300645 | A1* | 9/2020 | Schirano | ............ G01C 21/3676 |
| 2020/0404617 | A1* | 12/2020 | Murray | ............. H04W 52/0229 |
| 2021/0274466 | A1* | 9/2021 | Murray | ................ H04B 7/0695 |
| 2022/0333936 | A1* | 10/2022 | Schirano | ............ G01C 21/3676 |
| 2023/0092788 | A1* | 3/2023 | Kovács | ............. H04W 52/0258 370/311 |
| 2023/0199717 | A1* | 6/2023 | Murray | ................ H04W 16/28 455/458 |
| 2023/0232488 | A1* | 7/2023 | Van Phan | ............. H04W 76/27 370/328 |
| 2023/0262752 | A1* | 8/2023 | Hong | ................ H04W 74/0833 370/329 |
| 2023/0262779 | A1* | 8/2023 | Stern-Berkowitz | ........................... H04W 74/006 370/328 |
| 2024/0365395 | A1* | 10/2024 | Stern-Berkowitz | ..... H04W 4/90 |

* cited by examiner base station terminal

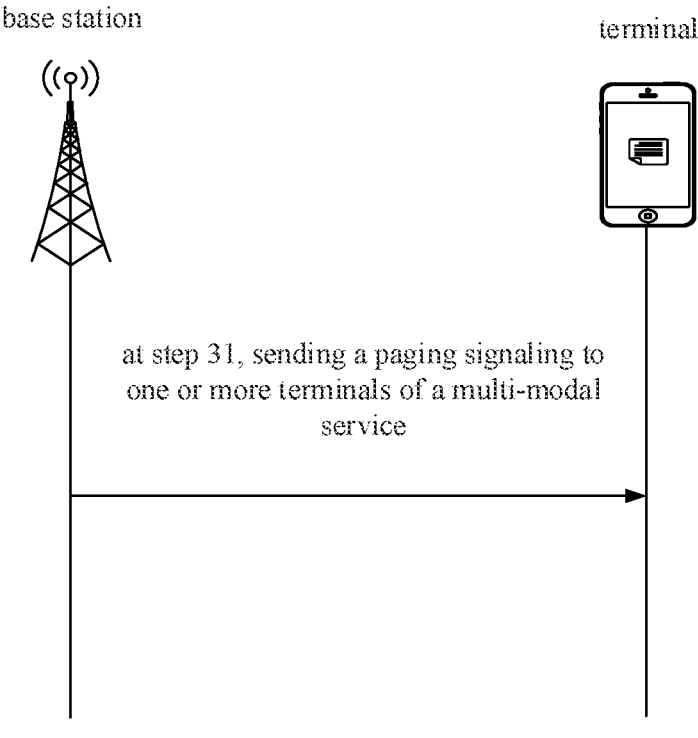

at step 31, sending a paging signaling to one or more terminals of a multi-modal service

FIG. 3 base station terminal

at step 31, sending a paging signaling to one or more terminals of a multi-modal service at step 41, setting up an RRC connection with the one or more terminals respectively in response to an access request of the multi-modal service sent based on the paging signaling

FIG. 4

METHOD FOR WIRELESS COMMUNICATION, TERMINAL, BASE STATION, COMMUNICATION DEVICE, AND STORAGE MEDIUM

CROSS-REFERENCE TO RELATED APPLICATION

The application is a national phase of International Application No. PCT/CN2020/105280, filed on Jul. 28, 2020, the entire content of which is incorporated herein by reference.

TECHNICAL FIELD

The disclosure relates to, but not limited to, the field of wireless communication technologies, and particularly to, a method for wireless communication, a terminal, a base station, a communication device, and a storage medium.

BACKGROUND

Intelligent interactions occur among intelligent agents (including people and things). The intelligent interactions among the intelligent agents are mostly passive and depend on required inputs. For example, for voice and visual interactions between people and a smart home product, a required input is unimodal. With the evolution of wireless communication technologies, multimodality will become normal, that is, inputs from multiple devices or multiple inputs from one device are sent to a centralized processing device or function. The centralized processing device or function synthesizes these inputs and obtains one or more outputs that satisfy needs of users. Multiple outputs can also be multiple outputs through multiple devices or multiple outputs through one device.

SUMMARY

According to a first aspect of the disclosure, a method for wireless communication is disclosed, which is applicable to a base station. The method includes: sending a paging signaling to one or more terminals of a multi-modal service.

According to a second aspect of the disclosure, a method for wireless communication is provided, which is applicable to a terminal. The method includes: monitoring a paging signaling, in which the paging signaling includes a paging signaling for paging one or more terminals of a multi-modal service.

According to a third aspect of the disclosure, a base station is provided, and includes: a processor; and a memory configured to store instructions executable by the processor; in which the processor is configured to implement the method as described in the first aspect when running the executable instructions.

According to a fourth aspect of the disclosure, a terminal is provided, and includes: a processor; and a memory configured to store instructions executable by the processor; in which the processor is configured to implement the method as described in the second aspect when running the executable instructions.

According to a fifth aspect of embodiments of the disclosure, a non-transitory computer-readable storage medium stored with a computer executable program is provided. The computer executable program implements the method as described in the first aspect or the second aspect when executed by a processor.

BRIEF DESCRIPTION OF THE DRAWINGS

FIG. 3 is a flowchart illustrating a method for wireless communication according to some embodiments.

FIG. 4 is a flowchart illustrating a method for wireless communication according to some embodiments.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit the embodiments of the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

For the purpose of conciseness and ease of understanding, the terms "greater than" or "less than" are used herein when characterizing the size relationship. However, those skilled in the art can understand that the term "greater than" also covers the meaning of "greater than or equal to", and "less than" also covers the meaning of "less than or equal to".

Figure 1:
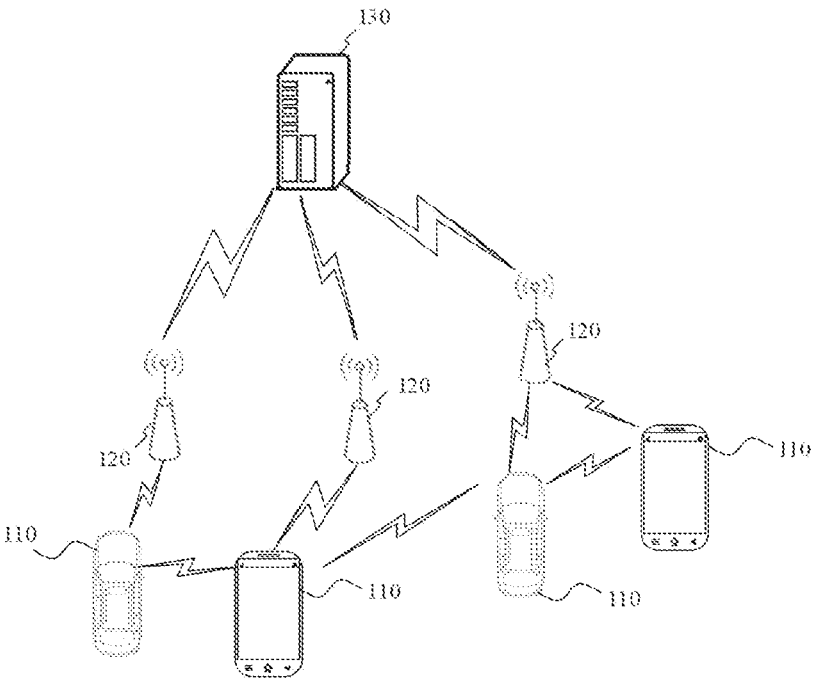
FIG. 1 is a schematic structural diagram of a wireless communication system according to some embodiments.

Reference to FIG. 1, FIG. 1 is a schematic structural diagram of a wireless communication system according to some embodiments of the disclosure. As shown in FIG. 1, the wireless communication system is a communication system based on cellular mobile communication technologies, and the wireless communication system may include several user equipments 110 and several base stations 120.

The user equipment 110 may be a device that provides speech and/or data connectivity for the user. The user equipment 110 may communicate with one or more core networks via a radio access network (RAN). The user equipment 110 may be an Internet of Things terminal, such as a sensor device, a mobile phone (or a "cellular" phone), and a computer having an Internet of Things terminal, for example, a fixed, portable, pocket-sized, handheld, computer built-in, or vehicle-mounted device. For example, it may be a station (STA), a subscriber unit, a subscriber station, a mobile station, a mobile; a remote station, an access point, a remote terminal, an access terminal, a user terminal, a user agent, a user device, or a user equipment. Alternatively, the user equipment 110 may also be a device of an unmanned aerial vehicle. Alternatively, the user equipment 110 may also be a vehicle-mounted device, for example, a trip computer having a wireless communication function or a wireless communication device connected to the trip computer. Alternatively, the user equipment 110 may also be a roadside device, for example, a street lamp, a signal lamp, or other roadside device having the wireless communication function.

The base station 120 may be a network side device in the wireless communication system. The wireless communication system may be the 4th generation mobile communication (4G) system, also known as the Long-Term Evolution (LTE) system; or, the wireless communication system may be the 5th generation mobile communication (5G) system, also known as the new radio (NR) system or 5G NR system. Alternatively, the wireless communication system may be the next generation system following the 5G system. The access network in the 5G system can be called the new generation-radio access network (NG-RAN).

The base station 120 may be an evolved node base station (eNB) used in the 4G system. Alternatively, the base station 120 may also be a next generation node base station (gNB) adopting a centralized and distributed architecture in the 5G system. When the base station 120 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a protocol stack of a Physical (PHY) layer. Embodiments of the disclosure may not limit the implementation manner of the base station 120.

A wireless connection may be set up between the base station 120 and the terminal 110 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

In some embodiments, an end to end (E2E) link may also be set up between the user equipments 110, for example, a vehicle to vehicle (V2V) communication, a vehicle to infrastructure (V2I) communication, and a vehicle to pedestrian (V2P) communication in a vehicle to everything (V2X) communication.

Herein, the above-mentioned user equipment may be regarded as the terminal device of the following embodiments.

In some embodiments, the above wireless communication system may also include a network management device 130.

The base stations 120 are coupled to the network management device 131) respectively. The network management device 130 may be a core network device in the wireless communication system. For example, the network management device 130 may be a mobility management entity (MME) of an evolved packet core (EPC). Alternatively, the network management device may also be other core network devices, such as a serving gateway (SGW), a public data network gateway (PGW), a policy and charging rules function (PCRF) unit, or a home subscriber server (HSS). The implementation form of the network management device 130 is not limited in the embodiments of the disclosure.

In order to facilitate the understanding of any embodiment of the disclosure, first, an application scenario of a multi-modal service is described.

Figure 2:
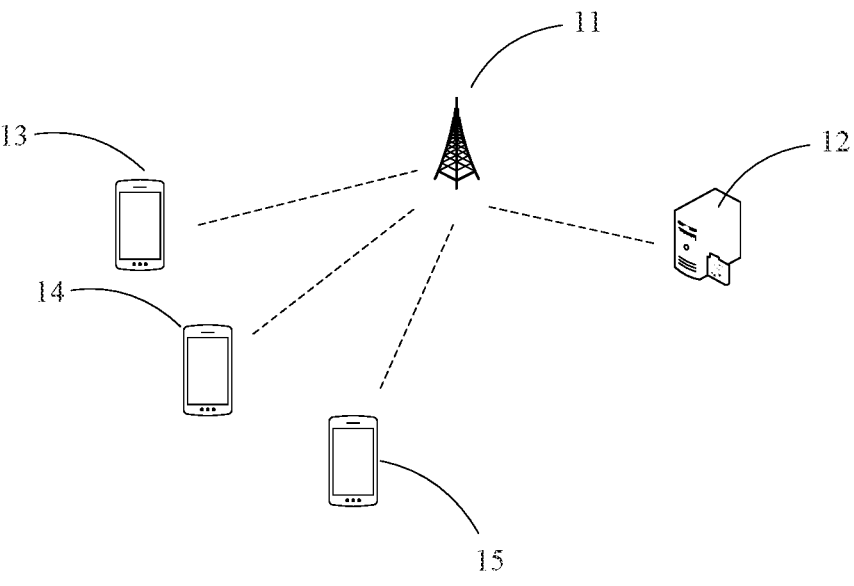
FIG. 2 is a flowchart illustrating an intelligent interaction scenario according to some embodiments.

Referring to FIG. 2, in some embodiments, a multi-modal service system includes a base station 11, a centralized processing device 12, a terminal 13, a terminal 14, and a terminal 15. In some embodiments, the terminal 13 and the terminal 14 are input devices for multi-modal services, the centralized processing device 12 is a processing device for multi-modal services, and the terminal 15 is an output device for multi-modal services. Herein, both the terminal 13 and/or the terminal 14 can input data in multiple modalities, for example, the terminal 13 can input data in two modalities. Herein, the centralized processing device 12 may process the data input by the terminal 13 and the terminal 14 and then send the processed data to the terminal 15. Herein, the data sent to the terminal 15 may be data output in multiple modalities. Herein, the centralized processing device 12 may use a machine learning algorithm to process the input data; for example, use a neural network algorithm to process the input data.

Herein, before the terminal 13 and/or the terminal 14 send data to the centralized processing device 12 or before the centralized processing device 12 sends data to the terminal 15, the terminal 13, the terminal 14, the terminal 15, and the centralized processing device 12 all need to set up a radio resource control (RRC) connection with the base station 11. The base station may page a corresponding terminal before setting up the RRC connection with the terminal. In some embodiments, when there are multiple terminals of the multi-modal service, if multiple terminals are paged one by one, on the one hand, a processing latency is long; on the other hand, each terminal may not set up the RRC connection with the base station simultaneously, so that input data of the multi-modal service may not be acquired and processed simultaneously.

As illustrated in FIG. 3, a method for wireless communication is provided in embodiments, which is applicable to a base station. The method includes the following step.

At step 31, a paging signaling is sent to one or more terminals of a multi-modal service.

Step 31 may be understood that one paging signaling is sent. The one paging signaling may page one or more terminals of one multi-modal service, for example, page multiple terminals of the multi-modal service.

The terminal may be, but is not limited to, a mobile phone, a wearable device, a vehicle-mounted terminal, a road side unit (RSU), a smart home terminal, an industrial sensing device and/or a medical device, or the like.

The base station is an interface device for the terminal to access the network. The base station may be various types of base stations, for example, a base station of a 3rd-generation mobile communication (3G) network, a base station of a 4G network, a base station of a 5G network, or other evolved base station.

In some embodiments, the multimodal service may be a service for data input in multiple modalities and/or data output in multiple modalities. Herein, data input in each modality may be performed through multiple terminals, or data input in each modality may be performed through one terminal. Herein, data output in each modality may be performed through multiple terminals, or data output in each modality may be performed through one terminal. Herein, data in one modality may be data having predetermined features. For example, data with pose features can be data in one modality, and data with face features can be data in another modality.

The multiple terminals of the multi-modal service are multiple terminals of a same multi-modal service. In some embodiments, the base station stores a corresponding relationship between the multi-modal service and multiple terminals of the multi-modal service. For example, multiple terminals of the multi-modal service include a terminal 1, a terminal 2, and a terminal 3. The base station may determine objects that need to send the paging signaling based on the corresponding relationship when needing to send the paging signaling to the terminals.

The paging signaling may be sent to multiple terminals of the multi-modal service which are in an RRC idle state.

In some embodiments, the base station may send the paging signaling to multiple terminals of the multi-modal service which are in the idle state when there are output data of the multi-modal service to be transmitted that need to be sent to multiple terminals of the multi-modal service which are in the RRC idle state. The multiple terminals of the multi-modal service may set up the RRC connection simultaneously when the paging signaling is received by the multiple terminals of the multi-modal service which are in the RRC idle state. The base station may send output data of the multi-modal service to multiple terminals of the multi-modal service. The output data of the multi-modal service to be transmitted may be sent to the base station via the core network when the centralized processing device processes the input data of the multi-modal service.

In some embodiments, when the centralized processing device requires multiple terminals of the multi-modal service which are in the RRC idle state to input data, a request is sent to the base station via the core network, and the base station sends the paging signaling to the multiple terminals of the multi-modal service which are in the RRC idle state based on the request. When the multiple terminals of the multi-modal service receive the paging signaling, the RRC connection with the multiple terminals of the multi-modal service may be set up simultaneously. The multiple terminals of the multi-modal service array transmit input data of the multi-modal service to the base station in time. And the input data of the multi-modal service may be sent through the base station to the centralized processing device for processing.

In some embodiments, when a multi-modal event occurs, the paging signaling may be sent to the multiple terminals of the multi-modal service which are in the RRC idle state.

In some embodiments, when the multi-modal event occurs, a current moment may be a set moment. For example, in a security system, when a set time point arrives, the base station needs to send the paging message to multiple cameras and voice sensors of the security service which are in an RRC idle state to acquire voice data and image data.

In some embodiments, the multi-modal service may be a multi-party authentication payment service. For example, if terminal A needs to complete the payment service, it needs to obtain the face data of terminal B and the voice data of terminal C for authentication. When terminal A performs the payment service, terminal A may send an authentication request to the base station through the core network. After receiving the authentication request, the base station sends the paging signaling to terminal B in the idle state and terminal C in the idle state of the payment service, After receiving the paging signaling, terminal B and terminal C set up the RRC connection with the base station. Then, terminal B sends the face data to the base station, and terminal C sends the voice data to the base station.

In some embodiments, the paging signaling may be sent to multiple terminals of the multi-modal service periodically until an access request sent by at least one paged terminal or all terminals paged by the paging signaling is received. In this way, multiple terminals of the multi-modal service which are in the idle state may be ensured to receive the paging signaling successfully by sending the paging signaling more than once.

In some embodiments, paging moments when the paging signaling is sent for different multi-modal services may be different. The terminal may monitor the paging signaling at a corresponding paging moment for different multi-modal services. For example, the paging moment of a multi-modal service 1 is a moment 1, and the paging moment of a multi-modal service 2 is a moment 2, so that the terminal may monitor the paging signaling of the multi-modal service 1 at the moment 1 and monitors the paging signaling of the multi-modal service 2 at the moment 2.

In embodiments of the disclosure, on the one hand, the base station may send the paging signaling to the terminal of the multi-modal service, and the terminal of the multi-modal service may be awakened in time to set up a radio resource control (RRC) connection with the base station. On the other hand, the base station may simultaneously send the paging signaling for paging multiple terminals to multiple terminals, and when receiving the paging signaling, multiple terminals of the multi-modal service may set up the RRC connection with the base station simultaneously and transmit data of the multi-modal service simultaneously. Compared with sending the paging signaling to multiple terminals of the multi-modal service respectively and setting up the RRC connection one by one, each of the terminals may transmit data of the multi-modal service simultaneously and a transmission latency of data may be shorter and a wireless resource for sending the paging signaling further may be saved.

In some embodiments, the paging signaling carries a same ID for the one or more terminals.

In some embodiments, each multi-modal service is allocated with an ID, For example, as illustrated in Table 1, an ID allocated for a service of identity authentication in multimodality is "001", and an ID allocated for a service of security monitoring in multimodality is "010".

TABLE 1

| multi-modal service type | ID |
|---|---|
| service of identity authentication in multimodality | 001 |
| service of security monitoring in multimodality | 010 |

In some embodiments, multiple terminals of a same multi-modal service store an ID of the multi-modal service. In some embodiments, the multiple terminals of the same multi-modal service store a mapping relationship between the ID of the multi-modal service and the paging moment corresponding to the multi-modal service. For example, as illustrated in Table 2, a mapping relationship between an ID "001" of a multi-modal service A and a monitoring moment "moment A", and a mapping relationship between an ID "010" of a multi-modal service B and a monitoring moment "moment B". The terminal may monitor multi-modal services corresponding to different monitoring moments based on the mapping relationship. When the paging signaling is monitored at the corresponding monitoring moment, the RRC connection is set up with the base station, and data transmission of the multi-modal service is performed.

Since each multi-modal service is correspondingly set with the ID, the terminal may confirm whether the paging message is the paging message of the multi-modal service belonging to the terminal based on the ID corresponding to the multi-modal service when monitoring the paging message sent by the base station.

In some embodiments, the terminal may monitor the paging message corresponding to the multi-modal service based on the monitoring moment determined by the stored ID corresponding to the multi-modal service, and respond to the paging message in response to the paging message carrying the ID corresponding to the multi-modal service when monitoring the paging message.

In some embodiments, the terminal may monitor the paging message based on the monitoring moment determined by the stored ID of the terminal, and respond to the paging message in response to the paging message carrying the ID of the terminal when monitoring the paging message.

In some embodiments, whether the ID corresponding to the multi-modal service carried in the paging message is monitored or the ID of the terminal carried in the paging message is monitored, the paging message may be responded.

The ID corresponding to the multi-modal service may be understood as an ID of the multi-modal service.

TABLE 2

| multi-modal service type | ID | monitoring moment |
|---|---|---|
| multi-modal service A | 001 | moment A |
| multi-modal service B | 010 | moment B |

In some embodiments, each multi-modal service is allocated with the ID. The mapping relationship between each ID and multiple terminals of the multi-modal service corresponding to the ID may be stored at the base station. As illustrated in Table 3, the ID of the multi-modal service A is "100", and multiple terminals of the multi-modal service A respectively include a terminal A, a terminal B, and a terminal C. When there is a multi-modal service requirement or a multi-modal service event occurs, the base station may send the paging signaling to the terminals of the multi-modal service based on the mapping relationship. Each terminal is triggered to set up the RRC connection with the base station simultaneously.

TABLE 3

| multi-modal service type | ID | terminals of multi-modal service |
|---|---|---|
| multi-modal service A | 100 | terminal A |
| | | terminal B |
| | | terminal C |

In some embodiments, the ID is temporarily allocated for the multi-modal service; or the ID is pre-allocated for the multi-modal service.

In some embodiments, it may be temporarily allocated for the multi-modal service when the multi-modal service is required. For example, the ID may be temporarily allocated for the multimodal service when there are output data of the multi-modal service to be transmitted that needs to be sent to multiple terminals of the multi-modal service which are in the RRC idle state. For another example, the ID may be temporarily allocated for the multimodal service when the centralized processing device requires multiple terminals of the multi-modal service which are in the RRC idle state to input data.

In other embodiments, it may be temporarily allocated for the multi-modal service when the multi-modal event occurs. For example, the ID may be temporarily allocated for the multi-modal service when a current moment is set a moment when the multi-modal event occurs.

When there are many multi-modal services, temporary allocation of the ID may reduce occupancy of ID resources, so that the ID is allocated more flexibly.

In some embodiments, the ID may be allocated for the multi-modal service when the terminal of the multi-modal service sets up the RRC connection with the base station.

In some embodiments, the ID may be pre-allocated, so that the terminal may be implemented to store the pre-allocated ID. When the ID is needed, the ID may be directly acquired from a storage area, which reduces the wireless resource consumed by the ID allocated by the network side.

In some embodiments, the ID is allocated by a core network or allocated by an access network.

In some embodiments, the ID may be allocated by the core network when the centralized processing device via the core network require the base station to page multiple terminals of the multi-modal service.

In some embodiments, the ID is allocated by the access network, which may be allocated to the multi-modal service before the base station sends the paging signaling.

As illustrated in FIG. 4, a method for wireless communication is provided in embodiments. The method includes the following step.

At step 41, an RRC connection is set up with the one or more terminals respectively in response to an access request of a multi-modal service sent based on a paging signaling.

In some embodiments, when the multiple terminals of the multi-modal service which are in an RRC idle state receives the paging signaling, the access request of the multi-modal service may be sent to the base station.

In some embodiments, when each of the multiple terminals of the multi-modal service which are in the RRC idle state receives the paging signaling, the access request of the multi-modal service may be sent to the base station. Each of the multiple terminals of the multi-modal service which are in the RRC idle state may set up the RRC connection with the base station in time, and perform data transmission of the multi-modal service in time.

In some embodiments, the base station may set up the RRC connection with multiple terminals respectively when receiving the access request sent by each of multiple terminals of the multi-modal service which are in the RRC idle state. The base station may set up the connection with multiple terminals in the RRC idle state simultaneously, to ensure timeliness of data transmission of each terminal. The base station may determine the multiple terminals based on the ID of the multi-modal service.

In some embodiments, the base station may set up the RRC connection with multiple terminals of the multi-modal service Which are in the RRC idle state simultaneously in response to receiving the access request of the multi-modal service sent by one terminal of the multi-modal service which is in the idle state based on the paging signaling. The base station may set up the connection with multiple terminals in the RRC idle state simultaneously, to ensure timeliness of data transmission of each terminal. The base station may determine the multiple terminals based on the ID of the multi-modal service.

In some embodiments, when the terminal of the multi-modal service does not monitor the ID of the terminal at a paging moment but monitors the ID corresponding to the ID of the multi-modal service, the access request may be sent to the base station immediately.

In some embodiments, the access request includes: an RRC connection setup request; or, an RRC connection resume request.

In some embodiments, multiple terminals of the multi-modal service which are in the RRC idle state trigger a random access process to set up the RRC connection. The terminal of the multi-modal service which is in the RRC idle state may send a preamble sequence for random access to the base station, and send the connection setup request to the base station based on a received random access response, and then receive a response message of the connection setup request sent by the base station, thereby setting up the RRC connection.

In some embodiments, multiple terminals of the multi-modal service which are in the RRC idle state triggers a random access process to resume the RRC connection. The terminal of the multi-modal service which is in the RRC idle state may send a preamble sequence for random access to the base station, and sends the connection resume request to the base station based on a received random access response, and then receive a response message of the connection resume request sent by the base station, thereby resuming the RRC connection.

In some embodiments, the paging signaling carries random access information of the terminal for access of the multi-modal service.

In some embodiments, the random access information includes a time-frequency domain resource and/or a preamble sequence for random access.

Figure 5:
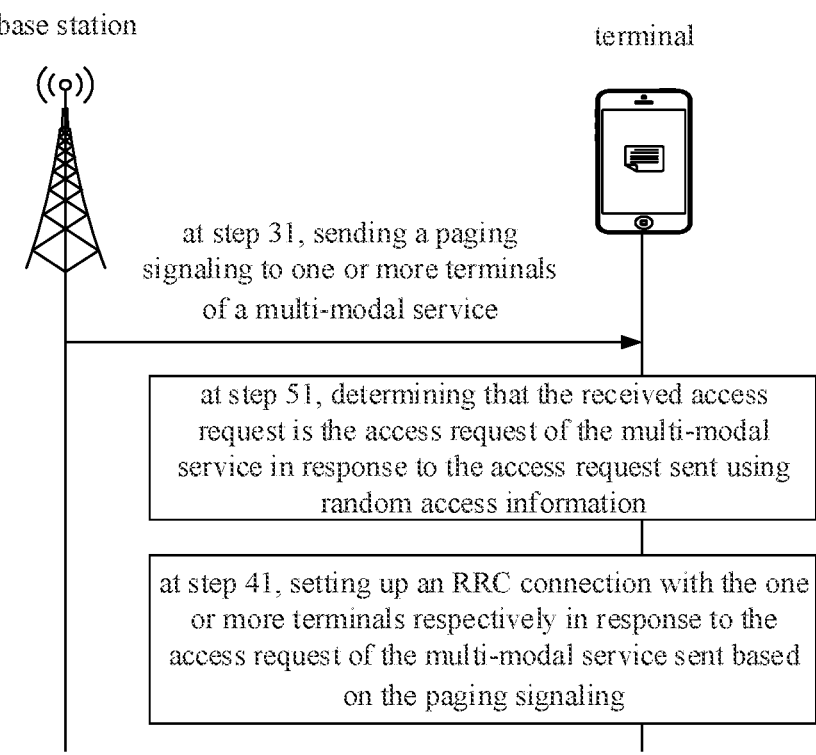
FIG. 5 is a flowchart illustrating a method for wireless communication according to some embodiments.

As illustrated in FIG. 5, a method for wireless communication is provided in embodiments. The method includes the following step.

At step 51, it is determined that the received access request is the access request of the multi-modal service in response to the access request sent using the random access information.

In some embodiments, it is determined that the received access request is the access request of the multi-modal service in response to the access request sent by the terminal using the time-frequency domain resource indicated using the random access information.

In another embodiment, it is determined that the received access request is the access request of the multi-modal service in response to the access request sent by the terminal using the preamble sequence indicated using the random access information.

The base station sets up the RRC connection with multiple terminals respectively when determining that the received access request is the access request of the multi-modal service.

In some embodiments, when each of the multiple terminals of the multi-modal service which are in the RRC idle state receives the paging signaling, the access request of the multi-modal service may be sent to the base station. When the base station determines that the received access request is the access request of the multi-modal service, each of multiple terminals of the multi-modal service which are in the RRC idle state may set up the RRC connection with the base station in time, and perform data transmission of the multi-modal service in time.

In some embodiments, the base station may set up the RRC connection with multiple terminals respectively when receiving the access request sent by each of multiple terminals of the multi-modal service which are in the RRC idle state and determining that the received access request is the access request of the multi-modal service. The base station may set up the connection with the multiple terminals in the RRC idle state simultaneously, to ensure timeliness of data transmission of each terminal. The base station may determine the multiple terminals based on the of the multi-modal service.

In some embodiments, the base station may set up the RRC connection with the multiple terminals of the multi-modal service which are in the RRC idle state simultaneously, in response to receiving the access request of the multi-modal service sent by one terminal in the idle state of the multi-modal service based on the paging signaling and determining that the received access request is the access request of the multi-modal service. The base station may set up the connection with the multiple terminals in the RRC idle state simultaneously, to ensure timeliness of data transmission of each terminal. The base station may determine the multiple terminals based on the ID of the multi-modal service.

Figures 6, 7:
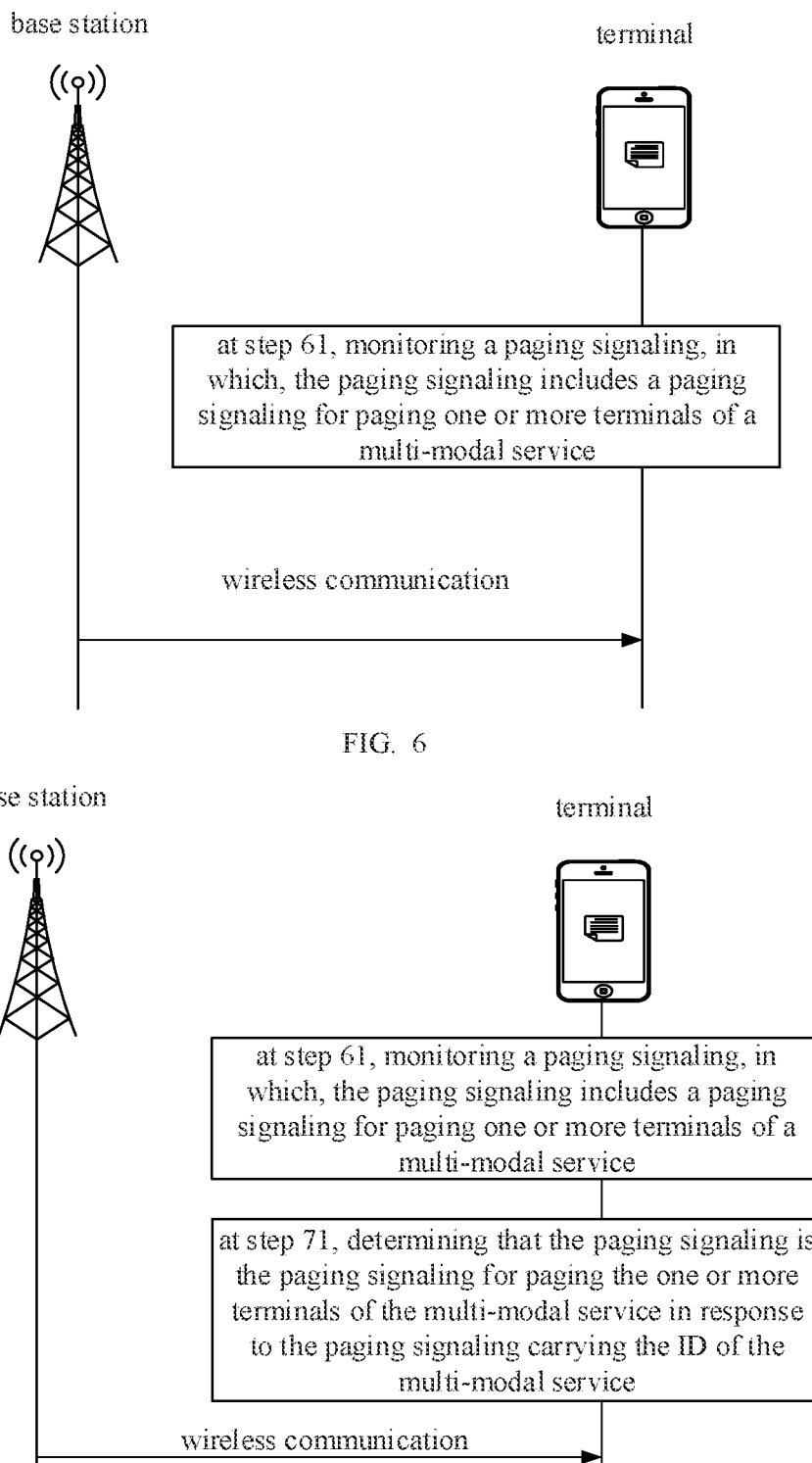
FIG. 6 is a flowchart illustrating a method for wireless communication according to some embodiments.
FIG. 7 is a flowchart illustrating a method for wireless communication according to some embodiments.

As illustrated in FIG. 6, a method for wireless communication is provided in embodiments, which is applicable to a terminal. The method includes the following step.

At step 61, a paging signaling is monitored. The paging signaling includes a paging signaling for paging one or more terminals of a multi-modal service.

The terminal may be, but is not limited to, a mobile phone, a wearable device, a vehicle-mounted terminal, an RSU, a smart home terminal, an industrial sensing device and/or a medical device, or the like.

The base station is an interface device for the terminal to access the network. The base station may be various types of base stations, for example, a base station of a 3G network, a base station of a 4G network, a base station of a 5G network, or other evolved base station.

In some embodiments, the multimodal service may be a service for data input in multiple modalities and/or data output in multiple modalities. Herein, data input in each modality may be performed through multiple terminals, or data input in each modality may be performed through one terminal. Herein, data output in each modality may be performed through multiple terminals, or data output in each modality may be performed through one terminal. Herein, data in one modality may be data having predetermined features. For example, data with pose features can be data in one modality, and data with face features can be data in another modality.

The multiple terminals of the multi-modal service are multiple terminals of a same multi-modal service. In some embodiments, the base station stores a corresponding relationship between the multi-modal service and multiple terminals of the multi-modal service. For example, multiple terminals of the multi-modal service include a terminal 1, a terminal 2, and a terminal 3. The base station may determine objects that need to send the paging signaling based on the corresponding relationship when needing to send the paging signaling to the terminals.

The paging signaling may be sent to multiple terminals of the multi-modal service which are in an RRC idle state.

In some embodiments, the base station may send the paging signaling to multiple terminals of the multi-modal service which are in the idle state when there are output data of the multi-modal service to be transmitted that need to be sent to multiple terminals of the multi-modal service which are in the RRC idle state. The multiple terminals of the multi-modal service may set up the RRC connection simultaneously when the paging signaling is received by the multiple terminals of the multi-modal service which are in the RRC idle state. The base station may send output data of the multi-modal service to multiple terminals of the multi-modal service. The output data of the multi-modal service to be transmitted may be sent to the base station via the core network when the centralized processing device processes the input data of the multi-modal service.

In some embodiments, when the centralized processing device requires multiple terminals of the multi-modal service which are in the RRC idle state to input data, a request is sent to the base station via the core network, and the base station sends the paging signaling to the multiple terminals of the multi-modal service which are in the RRC idle state based on the request. When the multiple terminals of the multi-modal service receive the paging signaling, the RRC connection with the multiple terminals of the multi-modal service may be set up simultaneously. The multiple terminals of the multi-modal service may transmit input data of the multi-modal service to the base station in time. And the input data of the multi-modal service may be sent through the base station to the centralized processing device for processing.

In some embodiments, when a multi-modal event occurs, the paging signaling may be sent to the multiple terminals of the multi-modal service which are in the RRC idle state.

In some embodiments, when the multi-modal event occurs, a current moment may be a set moment. For example, in a security system, when a set time point arrives, the base station needs to send the paging message to multiple cameras and voice sensors of the security service which are in an RRC idle state to acquire voice data and image data.

In some embodiments, the multi-modal service may be a multi-party authentication payment service. For example, if terminal A needs to complete the payment service, it needs to obtain the face data of terminal B and the voice data of terminal C for authentication. When terminal A performs the payment service, terminal A may send an authentication request to the base station through the core network. After receiving the authentication request, the base station sends the paging signaling to terminal B in the idle state and terminal C in the idle state of the payment service. After receiving the paging signaling, terminal B and terminal C set up the RRC connection with the base station. Then, terminal B sends the face data to the base station, and terminal C sends the voice data to the base station.

In some embodiments, the paging signaling may be sent to multiple terminals of the multi-modal service periodically until an access request sent by the terminal is received. In this way, multiple terminals of the multi-modal service which are in the idle state may be ensured to receive the paging signaling successfully by sending the paging signaling more than once.

In some embodiments, paging moments when the paging signaling is sent for different multi-modal services may be different. The terminal may monitor the paging signaling at a corresponding paging moment for different multi-modal services. For example, the paging moment of a multi-modal service 1 is a moment 1, and the paging moment of a multi-modal service 2 is a moment 2, so that the terminal may monitor the paging signaling of the multi-modal service 1 at the moment 1 and monitors the paging signaling of the multi-modal service 2 at the moment 2.

Since each service corresponds to the ID, the terminal may confirm whether the paging message is a paging message belonging to the terminal based on the ID when monitoring the paging message sent by the base station.

In some embodiments, the terminal may monitor the paging message corresponding to the multi-modal service based on the monitoring moment determined by the stored ID corresponding to the multi-modal service, and respond to the paging message in response to the paging message carrying the ID corresponding to the multi-modal service when monitoring the paging message.

In some embodiments, the terminal may monitor the paging message based on the monitoring moment determined by the stored ID of the terminal, and respond to the paging message in response to the paging message carrying the ID of the terminal when monitoring the paging message.

In some embodiments, whether the ID corresponding to the multi-modal service carried in the paging message is monitored or the ID of the terminal carried in the paging message is monitored, the paging message may be responded.

In embodiments of the disclosure, the base station may send the paging signaling for paging multiple terminals to the multiple terminals simultaneously, and multiple terminals of the multi-modal service may set up the RRC connection with the base station simultaneously and transmit data of the multi-modal service simultaneously when receiving the paging signaling. Compared with sending the paging signaling to multiple terminals of the multi-modal service respectively and setting up the RRC connection one by one, data of the multi-modal service may be transmitted simultaneously, and the transmission latency of data of the multi-modal service may be shorter.

In some embodiments, the paging signaling carries a same ID for the one or more terminals.

In some embodiments, each multi-modal service is allocated with an ID. For example, as illustrated in Table 1 again, an ID allocated for a service of identity authentication in multimodality is "001", and an ID allocated for a service of security monitoring in multimodality is "010".

In some embodiments, multiple terminals of a same multi-modal service store an ID of the multi-modal service. In some embodiments, the multiple terminals of the same multi-modal service store a mapping relationship between the ID of the multi-modal service and the paging moment corresponding to the multi-modal service. For example, as illustrated again in Table 2, a mapping relationship between an ID "001" of a multi-modal service A and a monitoring moment "moment A", and a mapping relationship between an ID "010" of a multi-modal service B and a monitoring moment "moment B". The terminal may monitor multi-modal services corresponding to different monitoring moments based on the mapping relationship. When the paging signaling is monitored at a corresponding monitoring moment, an RRC connection is set up with the base station, and data transmission of the multi-modal service is performed.

In some embodiments, each multi-modal service is allocated with the ID. The mapping relationship between each ID and multiple terminals of the multi-modal service corresponding to the ID may be stored at the base station. As illustrated again in Table 3, the ID of the multi-modal service A is "100", and multiple terminals of the multi-modal service A respectively includes a terminal A, a terminal B, and a terminal C. When there is a multi-modal service requirement or a multi-modal service event occurs, the base station may send the paging signaling to the terminals of the multi-modal service based on the mapping relationship. Each terminal is triggered to set up the RRC connection with the base station simultaneously.

As illustrated in FIG. 7, a method for wireless communication is provided in embodiments. The monitored paging signaling carries an ID of the multi-modal service the terminal participates in. The method includes the following step.

At step 71, it is determined that the paging signaling is the paging signaling for paging the one or more terminals of the multi-modal service in response to the paging signaling carrying the ID of the multi-modal service.

In some embodiments, paging moments when the paging signaling is sent for different multi-modal services may be different. The terminal may monitor the paging signaling at a corresponding paging moment for different multi-modal services. For example, the paging moment of a multi-modal service 1 is a moment 1, and the paging moment of a multi-modal service 2 is a moment 2, so that the terminal may monitor the paging signaling of the multi-modal service 1 at the moment 1, and monitors the paging signaling of the multi-modal service 2 at the moment 2. In some embodiments, multiple terminals of the same multi-modal service store a mapping relationship between the ID of the multi-modal service and the paging moment corresponding to the multi-modal service. When the terminal receives the paging signaling, it may be determined that the paging signaling is the paging signaling for paging multiple terminals of the multi-modal service based on the mapping relationship in response to the paging signaling carrying the ID of the multi-modal service.

Figure 8:
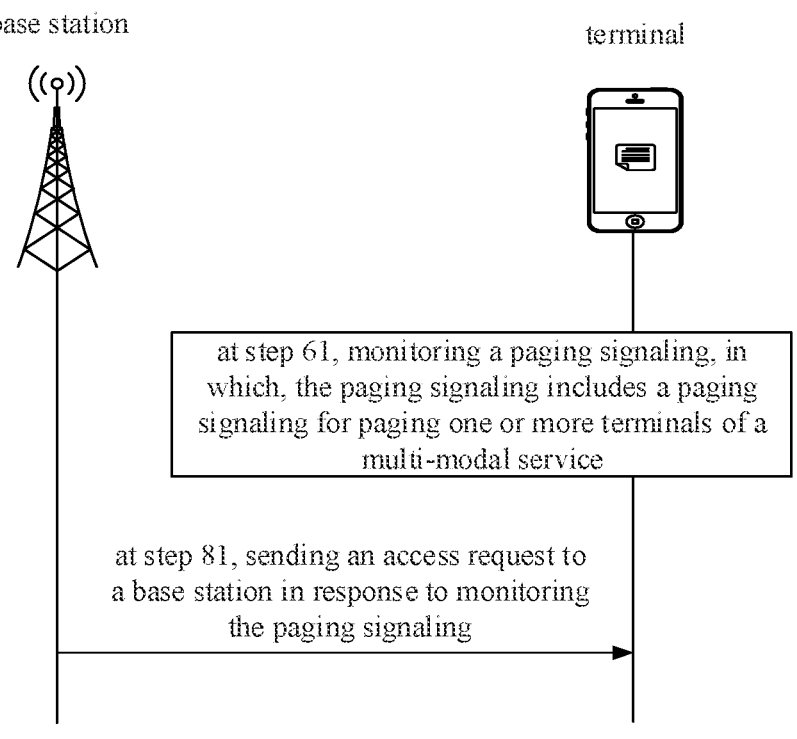
FIG. 8 is a flowchart illustrating a method for wireless communication according to some embodiments.

As illustrated in FIG. 8, a method for wireless communication is provided in embodiments. The method includes the following step.

At step 81, an access request is sent to a base station in response to monitoring the paging signaling.

In some embodiments, when the multiple terminals of the multi-modal service which are in an RRC idle state receives the paging signaling, the access request of the multi-modal service may be sent to the base station.

In some embodiments, when each of the multiple terminals of the multi-modal service which are in the RRC idle state receives the paging signaling, the access request of the multi-modal service may be sent to the base station. Each of the multiple terminals of the multi-modal service which are in the RRC idle state may set up the RRC connection with the base station in time, and perform data transmission of the multi-modal service in time.

In some embodiments, the base station may set up the RRC connection with multiple terminals respectively when receiving the access request sent by each of multiple terminals of the multi-modal service which are in the RRC idle state. The base station may set up the connection with multiple terminals in the RRC idle state simultaneously, to ensure timeliness of data transmission of each terminal. The base station may determine the multiple terminals based on the ID of the multi-modal service.

In some embodiments, the base station may set up the RRC connection with multiple terminals of the multi-modal service Which are in the RRC idle state simultaneously in response to receiving the access request of the multi-modal service sent by one terminal of the multi-modal service which is in the idle state based on the paging signaling. The base station may set up the connection with multiple terminals in the RRC idle state simultaneously, to ensure timeliness of data transmission of each terminal. The base station may determine the multiple terminals based on the ID of the multi-modal service.

In some embodiments, when the terminal of the multi-modal service does not monitor the ID of the terminal at a paging moment but monitors the ID corresponding to the ID of the multi-modal service, the access request may be sent to the base station immediately.

In some embodiments, the access request includes: an RRC connection setup request; or, an RRC connection resume request.

In some embodiments, multiple terminals of the multi-modal service which are in the RRC idle state trigger a random access process to set up the RRC connection. The terminal of the multi-modal service which is in the RRC idle state may send a preamble sequence for random access to the base station, and send the connection setup request to the base station based on a received random access response, and then receive a response message of the connection setup request sent by the base station, thereby setting up the RRC connection.

In some embodiments, multiple terminals of the multi-modal service which are in the RRC idle state triggers a random access process to resume the RRC connection. The terminal of the multi-modal service which is in the RRC idle state may send a preamble sequence for random access to the base station, and sends the connection resume request to the base station based on a received random access response, and then receive a response message of the connection resume request sent by the base station, thereby resuming the RRC connection.

In some embodiments, the paging signaling carries random access information of the terminal for access of the multi-modal service.

In some embodiments, the random access information includes a time-frequency domain resource and/or a preamble sequence for random access.

Figure 9:
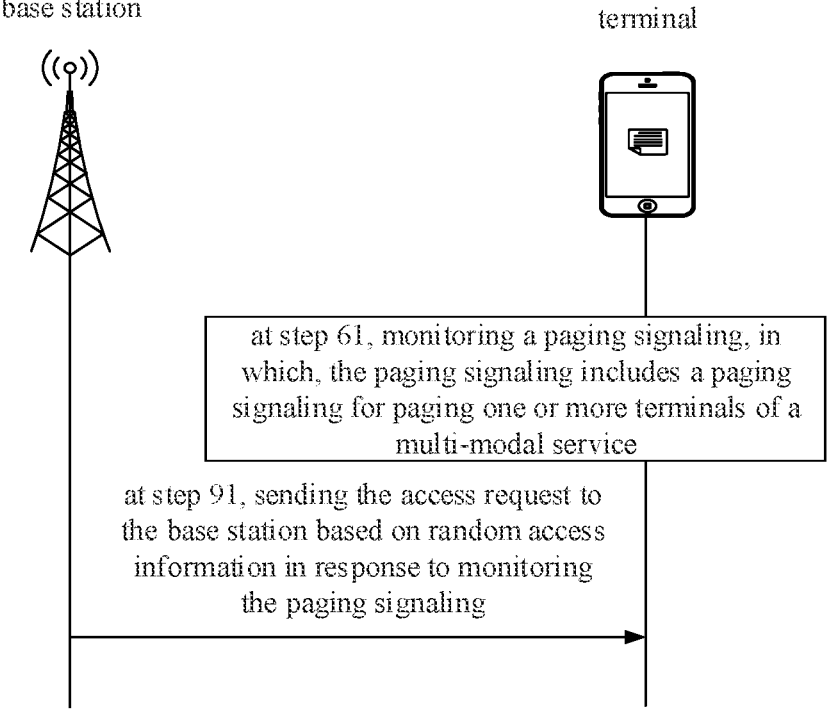
FIG. 9 is a flowchart illustrating a method for wireless communication according to some embodiments.

As illustrated in FIG. 9, a method for wireless communication is provided in embodiments. At step 81, the access request is sent to the base station in response to monitoring a paging signaling, which includes:

At step 91, the access request is sent to the base station based on random access information in response to monitoring the paging signaling.

In some embodiments, it is determined that the received access request is the access request of the multi-modal service in response to the access request sent by the terminal using the time-frequency domain resource indicated using the random access information.

In another embodiment, it is determined that the received access request is the access request of the multi-modal service in response to the access request sent by the terminal using the preamble sequence indicated using the random access information.

The base station sets up the RRC connection with multiple terminals respectively when determining that the received access request is the access request of the multi-modal service.

In some embodiments, when each of the multiple terminals of the multi-modal service which are in the RRC idle state receives the paging signaling, the access request of the multi-modal service may be sent to the base station. When the base station determines that the received access request is the access request of the multi-modal service, each of multiple terminals of the multi-modal service which are in the RRC idle state may set up the RRC connection with the base station in time, and perform data transmission of the multi-modal service in time.

In some embodiments, the base station may set up the RRC connection with multiple terminals respectively when receiving the access request sent by each of multiple terminals of the multi-modal service which are in the RRC idle state and determining that the received access request is the access request of the multi-modal service. The base station may set up the connection with the multiple terminals in the RRC idle state simultaneously, to ensure timeliness of data transmission of each terminal. The base station may determine the multiple terminals based on the ID of the multi-modal service.

In some embodiments, the base station may set up the RRC connection with the multiple terminals of the multi-modal service which are in the RRC idle state simultaneously in response to receiving the access request of the multi-modal service sent by one terminal in the idle state of the multi-modal service based on the paging signaling and determining that the received access request is the access request of the multi-modal service. The base station may set up the connection with the multiple terminals in the RRC idle state simultaneously, to ensure timeliness of data transmission of each terminal. The base station may determine the multiple terminals based on the ID of the multi-modal service.

Figure 10:
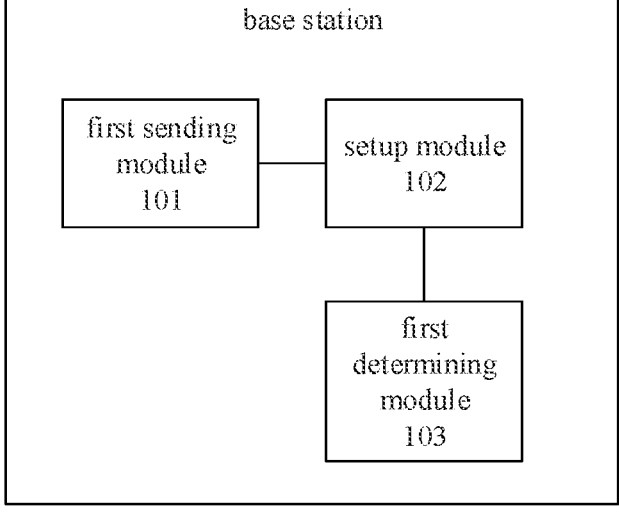
FIG. 10 is a schematic diagram illustrating a base station according to some embodiments.

As illustrated in FIG. 10, a base station is provided in embodiments. The base station includes a first sending module 101.

The first sending module 101 is configured to send a paging signaling to one or more terminals of a multi-modal service.

In some embodiments, the first sending module 101 is further configured as: the paging signaling carries a same ID for the one or more terminals.

In some embodiments, the first sending module 101 is further configured as: the ID is temporarily allocated for the multi-modal service; or, the ID is pre-allocated for the multi-modal service.

In some embodiments, the first sending module 101 is further configured as: the ID is allocated by a core network or allocated by an access network.

In some embodiments, the apparatus further includes a setup module 102. The setup module 102 is further configured to: set up an RRC connection with the one or more terminals respectively in response to an access request of the multi-modal service sent based on the paging signaling.

In some embodiments, the setup module 102 is further configured as the access request includes: an RRC connection setup request; or, an RRC connection resume request.

In some embodiments, the first sending module 101 is further configured as: the paging signaling carries random access information for access of the multi-modal service.

In some embodiments, the apparatus further includes a first determining module 103. The first determining module 103 is further configured to: determine that the received access request is the access request of the multi-modal service in response to the access request sent using the random access information.

In some embodiments, the first sending module 101 is further configured as: the random access information includes a time-frequency domain resource and/or a preamble sequence for random access.

Figure 11:
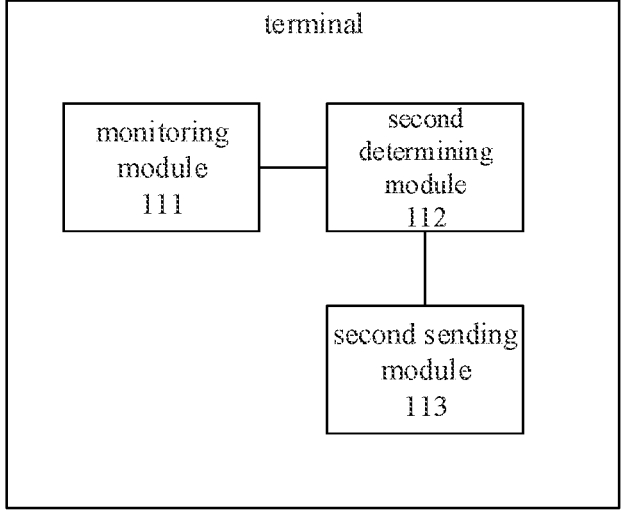
FIG. 11 is a schematic diagram illustrating a terminal according to some embodiments.

As illustrated in FIG. 11, a terminal is provided in embodiments. The terminal includes a monitoring module 111.

The monitoring module 111 is configured to monitor a paging signaling. The paging signaling includes a paging signaling for paging one or more terminals of a multi-modal service.

In some embodiments, the monitoring module 111 is further configured as: the paging signaling carries a same ID for the one or more terminals.

In some embodiments, the monitored paging signaling carries an ID of the multi-modal service the terminal participates in; the apparatus further includes a second determining module 112, The second determining module 112 is further configured to: determine that the paging signaling is the paging signaling for paging the one or more terminals of the multi-modal service in response to the paging signaling carrying the ID of the multi-modal service.

In some embodiments, the apparatus further includes a second sending module 113. The second sending module 113 is further configured to: send an access request to a base station in response to monitoring the paging signaling.

In some embodiments, the second sending module 113 is further configured as the access request includes: an RRC connection setup request; or, an RRC connection resume request.

In some embodiments, the monitoring module 111 is further configured as: the paging signaling carries random access information for access of the multi-modal service.

In some embodiments, the second sending module 113 is further configured to: send the access request to the base station based on the random access information in response to monitoring the paging signaling.

In some embodiments, the monitoring module 11 is further configured as: the random access information includes a time-frequency domain resource and/or a preamble sequence for random access.

With respect to the apparatuses in the above embodiments, the specific manners for performing operations for individual modules therein have been described in detail in the embodiments regarding the methods, which will not be elaborated herein.

A communication device is provided in embodiments of the disclosure, and includes: a processor; and a memory configured to store instructions executable by the processor; in which the processor is configured to: implement the method described in the above any embodiment when running the executable instructions.

The processor may include various types of storage media. The storage media are non-transitory computer storage media, and may continue memorizing and storing information thereon when the communication device is powered off.

The processor is connected to the memory via a bus, and may be configured to read an executable program stored on the memory.

A computer storage medium stored with a computer executable program is further provided in embodiments of the disclosure. The executable program implements the method as described in the above any embodiment when executed by a processor.

With respect to the devices in the above embodiments, the specific manners for performing operations for individual modules therein have been described in detail in the embodiments regarding the methods, which will not be elaborated herein.

Figure 12:
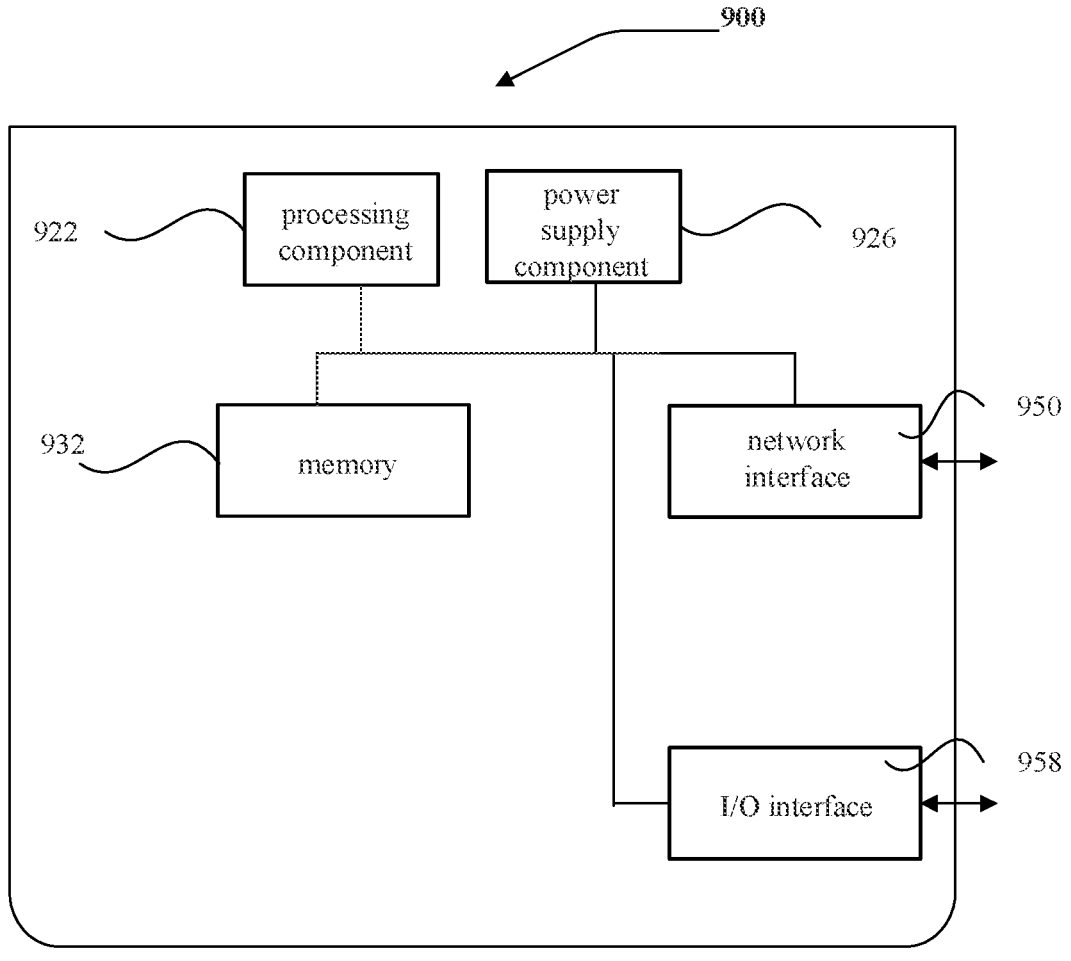
FIG. 12 is a block diagram illustrating a communication device according to some embodiments.

FIG. 12 is a block diagram illustrating a communication device 900 according to some embodiments of the disclosure. For example, the communication device 900 may be a terminal, or a base station provided as a network side device. As illustrated in FIG. 12, the device 900 includes a processing component 922, which further include one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to perform any one method applied to the base station as described in the above method.

The device 900 may further include a power supply component 926 configured to execute power management of the device 900, a wired or wireless network interface 950 configured to connect the device 900 to a network, and an input/output (I/O) interface 958. The device 900 may operate an operating system stored in the memory 932, for example, Windows Server™, Mac OS X™, Unix™, Linux™, FreeBSD™ or similar.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for wireless communication, performed by a base station, comprising:

sending a paging signaling to one or more terminals of a multi-modal service, wherein the paging signaling carries an ID of the multi-modal service a terminal participates in, and the terminal determines that the paging signaling is for paging the one or more terminals of the multi-modal service in response to the paging signaling carrying the ID of the multi-modal service.

2. The method of claim 1, wherein the paging signaling carries the ID for the one or more terminals.

3. The method of claim 2, wherein, the ID is temporarily allocated for the multi-modal service;

or, the ID is pre-allocated for the multi-modal service.

4. The method of claim 2, wherein the ID is allocated by a core network or allocated by an access network.

5. The method of claim 1, further comprising:

setting up a radio resource control (RRC) connection with the one or more terminals respectively in response to an access request of the multi-modal service sent based on the paging signaling.

6. The method of claim 5, wherein the access request comprises at least one of:

an RRC connection setup request; or an RRC connection resume request.

7. The method of claim 5, wherein the paging signaling carries random access information of the terminal for the multi-modal service.

8. The method of claim 7, further comprising:

determining the access request of the multi-modal service in response to the access request being sent using the random access information.

9. The method of claim 7, wherein the random access information comprises at least one of a time-frequency domain resource or a preamble sequence for random access.

10. A method for wireless communication, performed by a terminal, comprising:

monitoring a paging signaling, wherein the paging signaling is for paging one or more terminals of a multi-modal service, and carries an ID of the multi-modal service the terminal participates in; and determining that the paging signaling is for paging the one or more terminals of the multi-modal service in response to the paging signaling carrying the ID of the multi-modal service.

11. The method of claim 10, wherein the paging signaling carries the ID for the one or more terminals.

12. The method of claim 10, further comprising:

sending an access request to a base station in response to monitoring the paging signaling.

13. The method of claim 12, wherein the access request comprises at least one of:

an RRC connection setup request; or an RRC connection resume request.

14. The method of claim 12, wherein the paging signaling carries random access information for access of the multi-modal service.

15. The method of claim 14, wherein sending the access request to the base station in response to monitoring the paging signaling, comprises:

sending the access request to the base station based on the random access information in response to monitoring the paging signaling.

16. The method of claim 14, wherein the random access information comprises at least one of a time-frequency domain resource or a preamble sequence for random access.

17. A base station, comprising:

a processor; and a memory storing instructions executable by the processor;

wherein the processor is configured to send a paging signaling to one or more terminals of a multi-modal service, wherein the paging signaling carries an ID of the multi-modal service a terminal participates in, and the terminal determines that the paging signaling is for paging the one or more terminals of the multi-modal service in response to the paging signaling carrying the ID of the multi-modal service.

18. A non-transitory computer-readable storage medium stored with computer executable instructions that, when executed by a processor, cause the processor to perform the method of claim 1.

19. A terminal, comprising:

a processor; and a memory storing instructions executable by the processor;

wherein the processor is configured to perform the method of claim 10.

\* \* \* \* \*